United States Patent
Andersson et al.

(10) Patent No.: US 6,354,659 B1
(45) Date of Patent: Mar. 12, 2002

(54) VEHICLE SEAT

(75) Inventors: Tommy Andersson, Växjo (SE); Timothy Barnett, Oxt (GB)

(73) Assignee: Autoliv Development AB (SE)

( * ) Notice: Subject to any disclaimer, the term of this patent is extended or adjusted under 35 U.S.C. 154(b) by 0 days.

(21) Appl. No.: 09/508,334

(22) PCT Filed: Sep. 7, 1998

(86) PCT No.: PCT/SE98/01578

§ 371 Date: Jul. 5, 2000

§ 102(e) Date: Jul. 5, 2000

(87) PCT Pub. No.: WO99/12765

PCT Pub. Date: Mar. 18, 1999

(30) Foreign Application Priority Data

Sep. 10, 1997 (GB) .............................................. 9719265

(51) Int. Cl.[7] .............................................. B60N 2/427
(52) U.S. Cl. .......................... 297/216.14; 297/216.13; 297/216.12
(58) Field of Search ......................... 297/216.1, 216.12, 297/216.13, 216.14, 216.15

(56) References Cited

U.S. PATENT DOCUMENTS

| | | | | |
|---|---|---|---|---|
| 2,795,266 A | * | 6/1957 | Walther | |
| 3,145,051 A | * | 8/1964 | Rausch | |
| 5,454,622 A | * | 10/1995 | Demopoulos | |
| 5,772,280 A | * | 6/1998 | Massara | |

FOREIGN PATENT DOCUMENTS

| | | |
|---|---|---|
| DE | 195 13 705 | 10/1996 |
| GB | 1 228 657 | 4/1971 |
| GB | 1 285 360 | 8/1972 |
| GB | 1441680 | 7/1976 |
| GB | 2 311 212 | 9/1997 |

* cited by examiner

*Primary Examiner*—Milton Nelson, Jr.
(74) *Attorney, Agent, or Firm*—Venable; George H. Spencer; Robert Kinberg

(57) ABSTRACT

A vehicle seat comprises an inner framework, the inner framework defining a first portion (11, 12, 13, 14) to be received within the squab of the seat and the second portion (15, 16, 17) to be received within the back of the seat. The second portion (15, 16, 17) is mounted on the first portion (11, 12, 13, 14) for rearward pivotal movement about a predetermined pivotal axis (19). Connected between an element (20) which moves in response to movement of the second portion of the framework (15, 16, 17) and the first portion of the framework (11, 12, 13, 14) is an element that provides a mechanical advantage, in the form of a lever arm (27) and a damper in the form of a gas springs (32). The mechanical advantage provided by the lever arm element (27) changes as the second portion of the framework (15, 16, 17) pivots rearwardly about the pivot axis (19). Thus, in a rear impact, an occupant of the seat is given a gradual acceleration.

12 Claims, 8 Drawing Sheets

VEHICLE SEAT

FIELD OF THE INVENTION

The present invention relates to a vehicle seat and more particularly, relates to a vehicle seat intended for use in a motor vehicle such as a motor car.

BACKGROUND OF THE INVENTION

It has been appreciated that if a motor vehicle, such as a motor car, is involved in a rear-end collision, or rear impact,—that is to say if a following vehicle runs into the back of the car—the occupants of the struck car often suffer from neck injuries.

It is to be understood that during a rear-end collision of this type, the vehicle that is struck is subjected to a forward acceleration. This imparts a forward acceleration to the seats of the vehicle. The squab and the back of each occupied seat engage the posterior and torso of the occupant of the seat and impart a substantial acceleration to the posterior and torso of the occupant. However, no corresponding acceleration is immediately imparted to the head of the occupant. The head is a part of the body that has substantial mass, and consequently the head has substantial inertia.

Thus, whilst the posterior and torso of the occupant of the vehicle are accelerated forwardly as a result of the rear-end collision, the head of the occupant of the vehicle initially remains stationary. This causes the neck initially to adopt a "S"-shaped configuration as the lower part of the neck moves forwardly, whilst remaining vertical, and the upper part of the neck remains in its initial position. Subsequently, the head begins to rotate, and the neck then occupies a curved configuration. The head subsequently moves forwardly. Research has shown that "whiplash" injuries may occur when the neck adopts the "S"-shaped configuration, if the head is moving, relative to the torso, at a substantial speed.

SUMMARY OF THE INVENTION

The present invention seeks to provide an improved vehicle seat in which the risk of "whiplash" injuries occurring to the occupant of the seat during a rear-end collision are reduced.

According to this invention there is provided a vehicle seat, the seat comprising an inner framework; the inner framework defining a first portion to be received within the squab of a seat and second portion to be received within the back of a seat, the second portion being mounted on the first portion for rearward pivotal movement about the predetermined pivotal axis; there being a damper, together with dampening mechanism providing a mechanical advantage, connected between the first portion and the second portion, to dampen said rearward pivotal movement; the dampening mechanism providing the mechanical advantage being disposed so that as the second portion of the frame moves rearwardly, pivotally relative to the first portion, the mechanical advantage changes so that the dampening effect increases.

Preferably the damper comprises a gas spring.

Conveniently the dampening mechanism providing a mechanical advantage comprises a pivotally mounted lever arm element comprising two lever arms, one lever arm being connected to the damper, and the other lever arm being connected to a component which moves in response to said rearward pivotal movement of the second framework portion about the predetermined axis.

Advantageously during pivotal movement of the lever arm element as a consequence of rearward pivotal movement of the second framework portion about said predetermined pivotal axis, the effective length of one lever arm reduces, and the effective length of the other lever aim increases to provide the said change in mechanical advantage.

Preferably said one pivotal arm is connected to the said component which moves in response to said rearward pivotal movement of the second framework portion about the predetermined pivotal axis by means which move axially of the lever arm as the lever arm element moves pivotally.

Conveniently the first lever arm defines an elongate substantially axially extending slot and the said component carries an element engaged with the slot, which move axially along the slot as the lever arm element moves pivotally.

Preferably the lever arm element is pivotally mounted on a support plate, the said component which moves in response to rearward pivotal movement of the second portion of the framework about the predetermined pivotal axis, also being pivotally connected to the fixing plate to define said predetermined pivotal axis.

Advantageously the component comprises a fixing plate carried by a recliner mechanism, the recliner mechanism having another fixing plate which is connected to the second portion of the framework adapted to be received within the back of the seat.

Preferably the back of the vehicle seat is provided with a head-rest support frame, an elevating mechanism being provided to cause the head-rest support frame to move to an elevated position, relative to the back of the seat, in response to said rearward pivotal movement of the second portion of the framework about the predetermined pivotal axis.

Conveniently the elevating mechanism provided to move the head-rest support frame to the elevated position comprises a Bowden cable, the core of which is connected to move the head-rest support frame upwardly against a spring bias when the core of the cable is subjected to tension, and a tension mechanism to subject the core of the cable to tension in response to rearward pivotal movement of the back of the seat about the predetermined pivotal axis.

Advantageously the core of the Bowden cable is connected to a lever, the lever also being connected to at least one Bowden cable having its core connected to parts of a mechanism which move relative to fixed points in a rearward pivotal movement of the back of the seat about the predetermined pivotal axis, with the core of the Bowden cables being connected to said fixed point.

In order that the invention may be more readily understood and so that further features thereof may be appreciated, the invention will now be described, by way of example, with reference to the accompanying drawings in which:

DETAILED DESCRIPTION OF THE PREFERRED EMBODIMENTS

Referring initially to FIG. 1 of the accompanying drawings, illustration A shows the position of the head 1 and neck 2 of the occupant of a motor vehicle during ordinary conditions. The head and neck would occupy this position if, for example, the vehicle were stationary.

Assuming that the vehicle was then subjected to a rear impact, the posterior and torso of the occupant of the vehicle would be moved forwardly, as a consequence of the forward movement of the vehicle and the forward movement of the seat mounted in the vehicle. The head 1 of the occupant would tend to remain stationary. A neck 2 of the occupant would then have the condition shown in illustration B. The neck here has a "S" configuration. Subsequently, as shown in illustration C, the head 1 moves rearwardly, thus giving the neck 2 an arcuate configuration and, if the head does not impinge on the head-rest, the head can move to the tilted back position shown in illustration D where the neck 2 is bent back (hyperextension) with a very significant degree of curvature.

It is believed that if the neck is subject to the distortions shown in illustrations A to D, the hydro-dynamic pressure of the fluid within the spine can rise suddenly, when the neck adopts the "S"-shaped configuration, thus imparting pressure shocks to parts of the central nervous system in contact with that fluid. Also, injuries may well be imparted to the ganglia. It is believed that this is why patients with so-called "whiplash" injuries may suffer from the effects of those injuries for a long time. Even though a typical rear impact collision occurs with a relatively low impact speed, these collisions are responsible for a large number of relatively serious injuries each year.

Figure 1A:
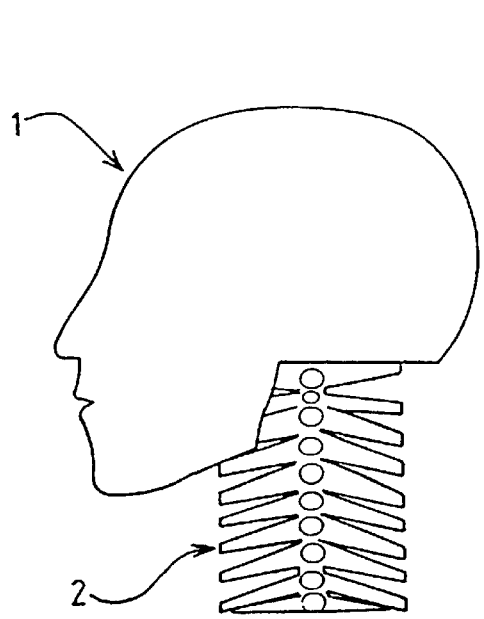
FIG. 1 is a diagrammatic view comprising four illustrations showing the condition of the head and neck of an occupant of the vehicle in a rear collision situation where a conventional seat is used.
Figure 1B:
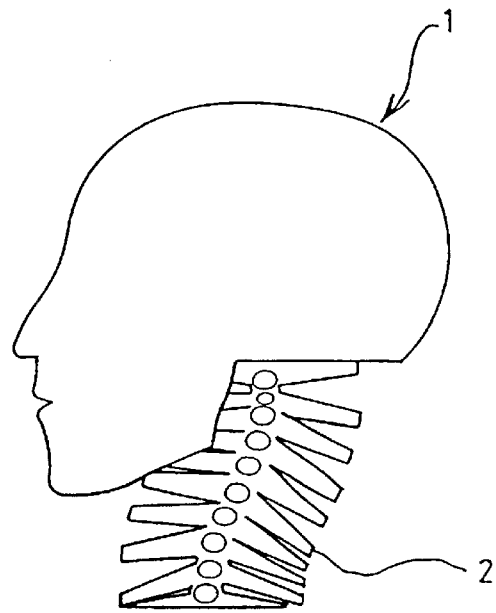
Figure 1C:
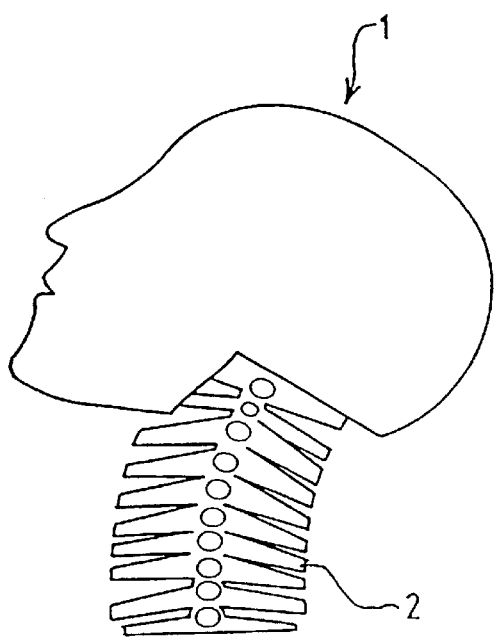
Figure 1D:
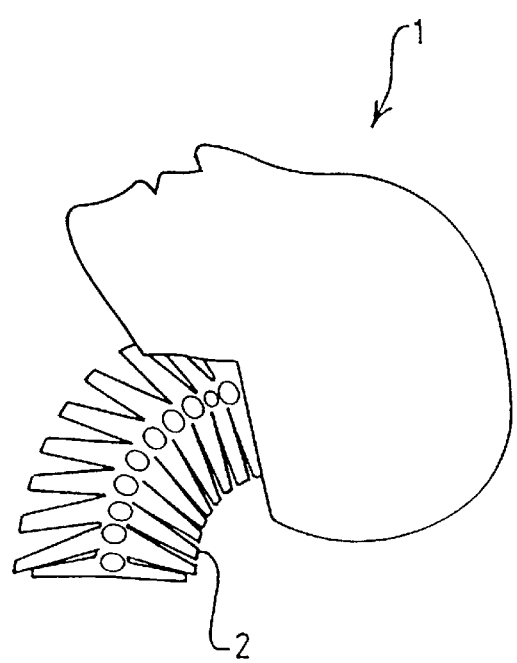
Figure 2:
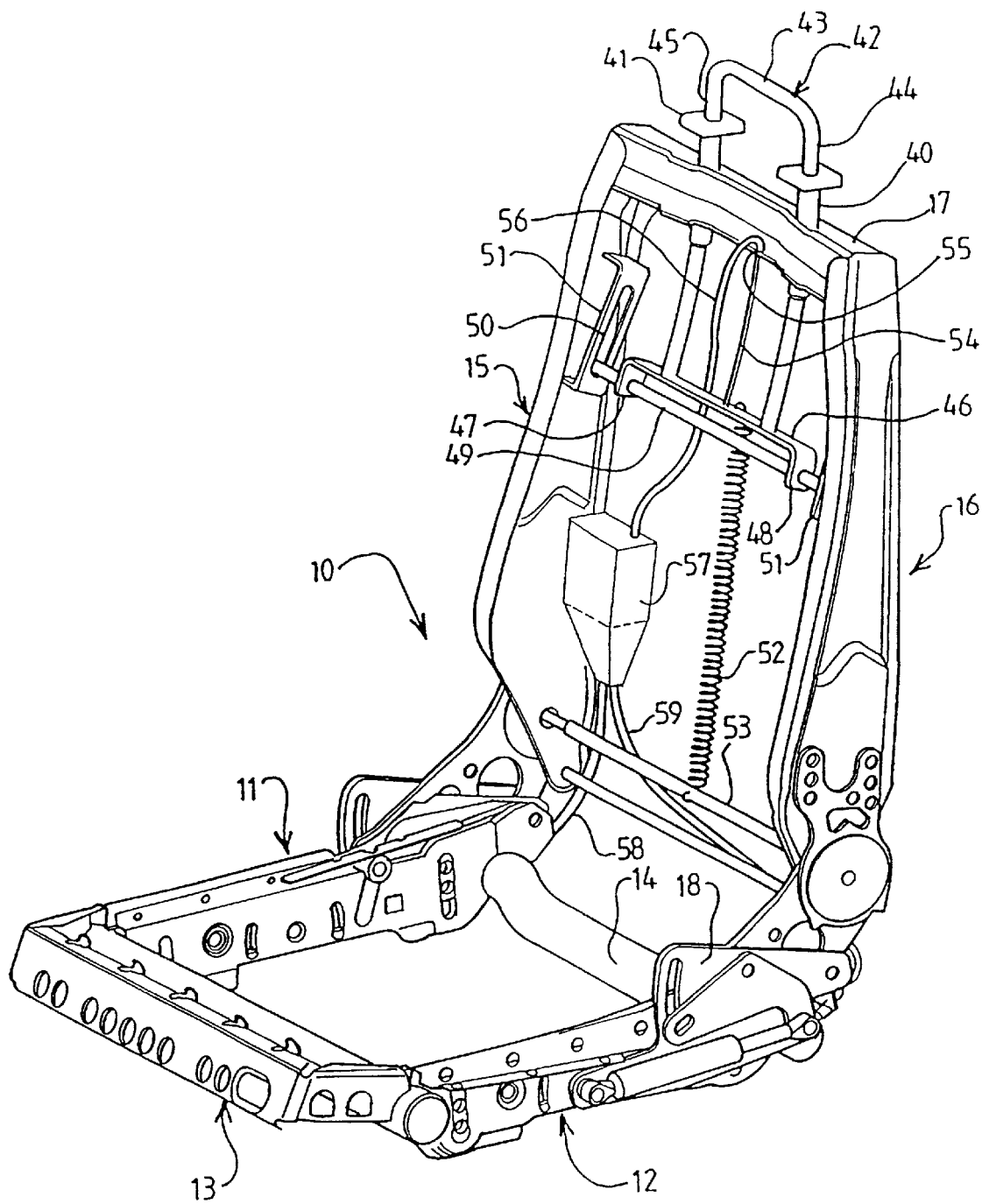
FIG. 2 is a perspective view of the frame of a vehicle seat, with the padding and upholstery removed.

Referring to FIG. 2 of the accompanying drawings a frame 10 of a vehicle seat is illustrated. The frame 10 comprises two parallel arms 11,12, the forward ends of which are inter-connected by a transverse bar 13 and the rearward ends of which are connected by a transverse beam 14. The arms 11, 12, 13 and the beam 14 define a first portion of the framework which will be located in the squab of the seat.

The seat further comprises two vertical arms 15,16, the upper ends of which are inter-connected by a horizontal arm 17, and the arms 15, 16 and 17 form a second portion of the framework that will be located in the back of the seat.

Figure 3:
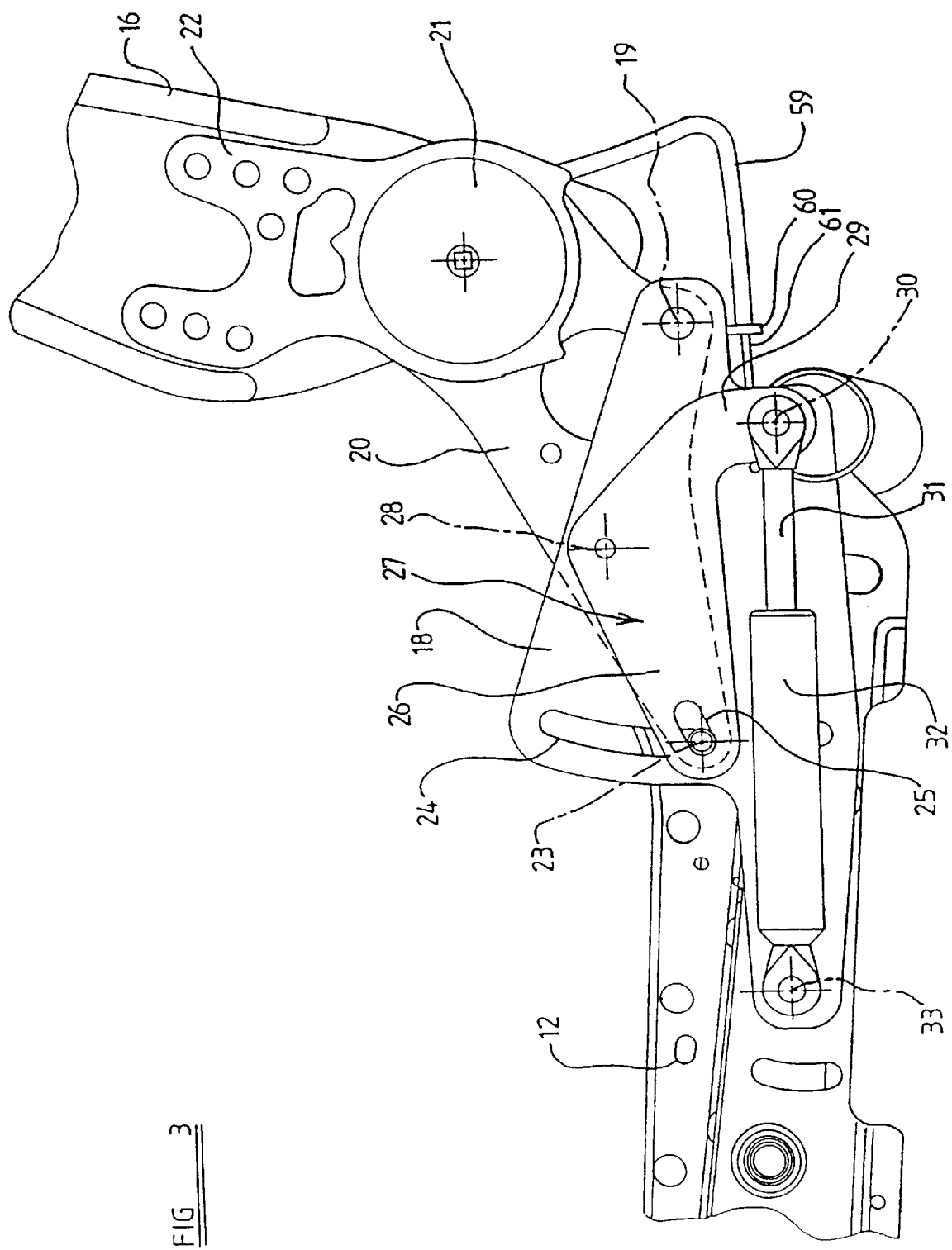
FIG. 3 is an enlarged side elevational view of part of the seat of FIG. 2, wit part shown in phantom.
Figure 4:
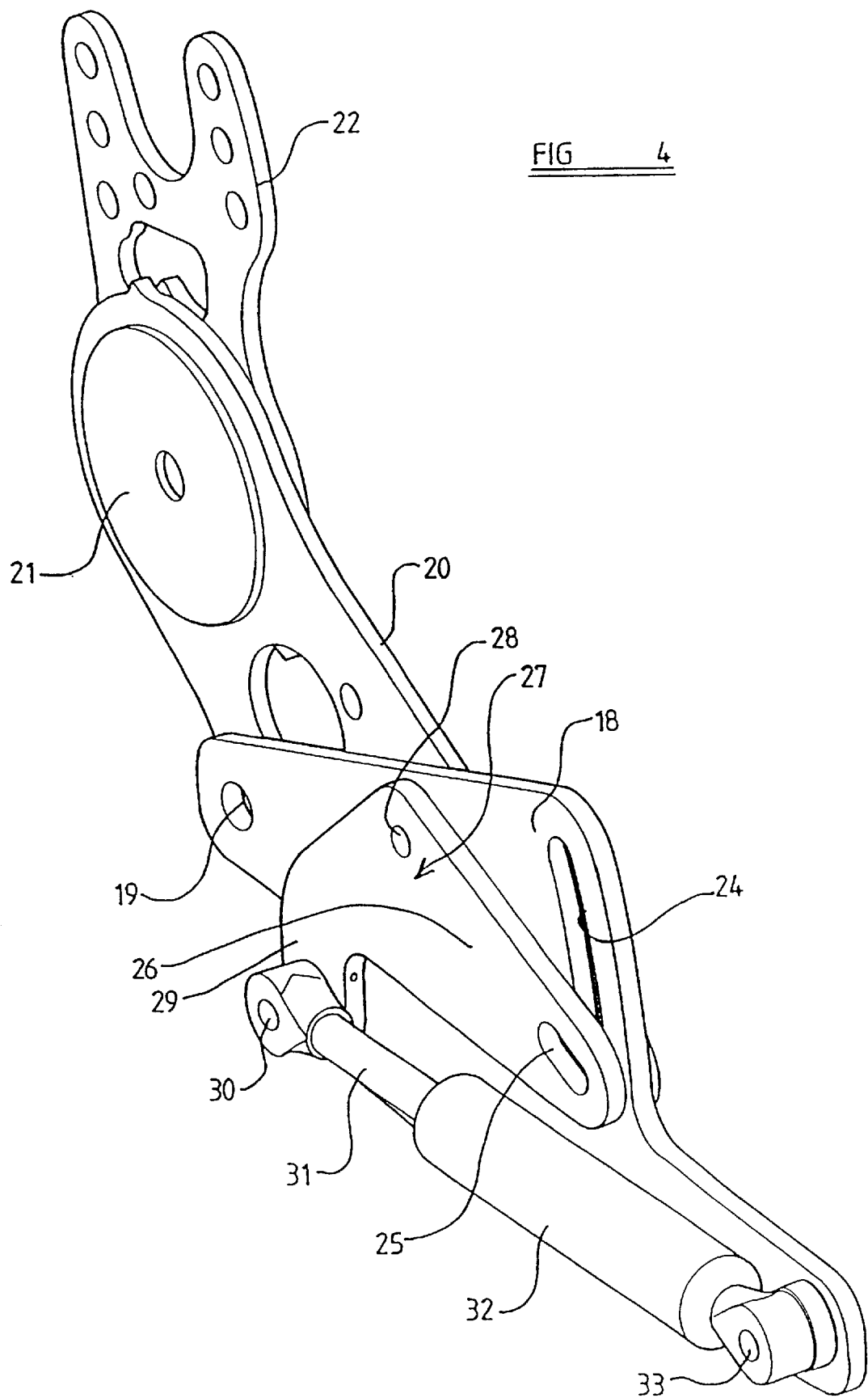
FIG. 4 is a perspective view of the principal components of the part of the seat illustrated in FIG. 3.

Referring now additionally to FIG. 3, it is to be observed that the arm 12 carries towards its rear end, a substantially vertical fixing plate 18. The fixing plate 18 is provided, towards its rear end, with an aperture which receives a pivot pin defining a pivot axis 19. The pivot pin serves to mount, on the fixing plate 18, an intermediate element 20 in the form of an elongate plate which forms one connecting plate of a recliner mechanism 21. The recliner mechanism may be of conventional form and has a second connecting plate 22 which is connected to the arm 16 forming the side of the frame for the back of the seat.

As will be appreciated from FIG. 2, an equivalent arrangement is provided on each side of the seat, and thus it is to be appreciated that the back of the seat is connected to the squab of the seat through two recliner mechanisms 21, which permits the conventional adjustment of the angle of rake of the back of the seat to suit the comfort of the driver or occupant of the vehicle, but the intermediate element 20 that forms one arm of each of the recliner mechanisms is pivotally connected to the support plate 18 by the pivot pin that defines the pivot axis 19.

Figure 5:
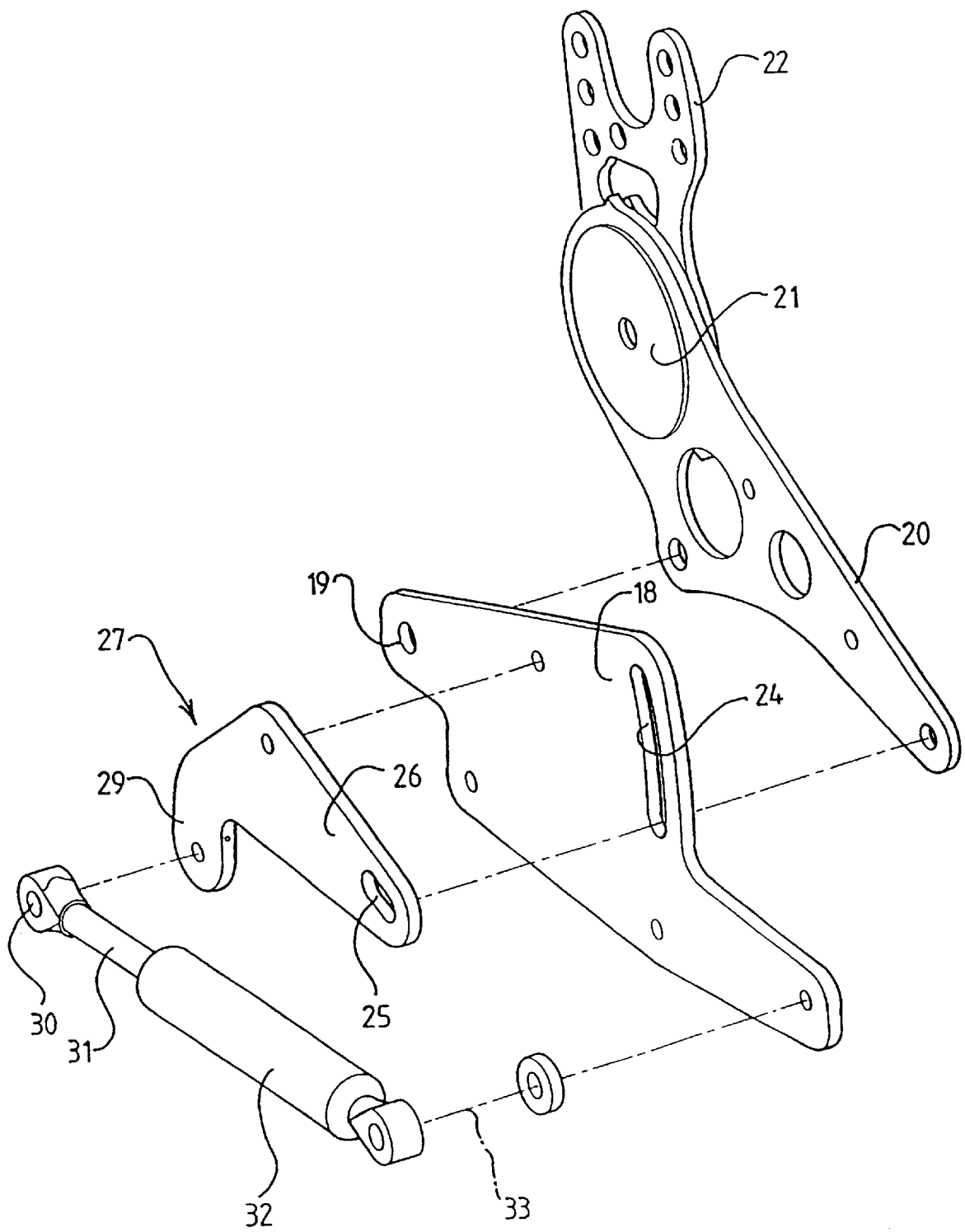
FIG. 5 is a view corresponding to FIG. 4 showing the components in an exploded condition.

The forward end of the intermediate element 20, which is of generally triangular form (as can be seen from FIG. 3 where the periphery of the element is shown in phantom, and also from FIG. 5) carries a transversely extending connecting pin 23. The transversely extending connecting pin 23 passes though an arcuate slot 24 formed in the fixing plate 18, and also passes through a linear oval slot 25 formed at the end of one lever arm 26 of a lever arm plate 27. The lever arm plate 27 is of generally triangular form and is mounted by a pivot for pivotal movement relative to the fixing plate 18 about a pivot axis 28 located adjacent an upper apex of the lever arm plate 27. The other lever arm of the lever arm plate 27 terminates in a depending lug 29, which is connected by a pivot pin defining a pivot axis 30 to a piston 31 which forms part of a conventional damper or gas spring 32. The other end of the damper or gas spring 32 is connected by an appropriate connector 33 to part of the vertical fixing plate 18.

It is to be appreciated that when a vehicle in which the illustrated seat is mounted is involved in a rear impact, the torso of the occupant of the seat will cause a rearwardly directed force to be applied to the back of the seat. This will tend to cause the entire back of the seat to pivot about the pivot axis 19. As the seat back pivots rearwardly about this pivot axis, the intermediate element will rotate about the pivot axis 19, and the transverse connecting pin 23 at the forward end of the intermediate element 20 will move up the arcuate slot 24. The lever arm 26 of the lever arm plate 27 will move upwardly, with the lever arm plate 27 pivoting about the pivot axis 28. The depending lug 29 will thus tend to move towards the left as shown in FIG. 3, against a retarding force provided by the damper or gas spring 32. The rearward movement of the back of the seat will thus be damped by the damper or gas spring 32.

Figure 6A:
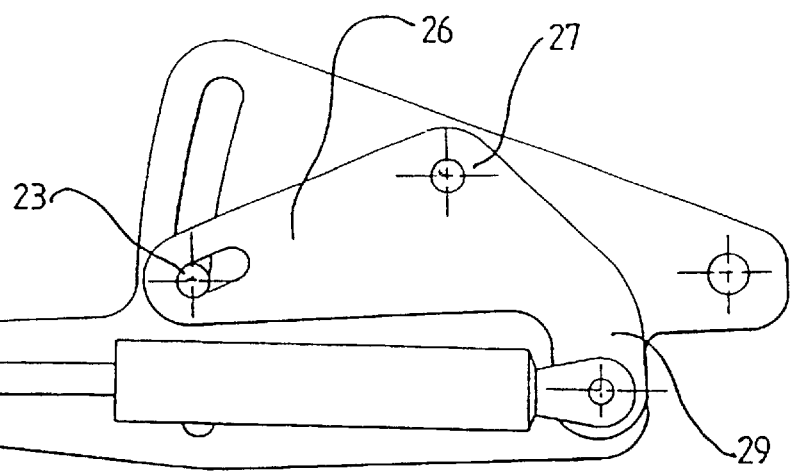
FIG. 6 is a diagrammatic side view illustrating the components of FIGS. 4 and 5 in alternate conditions.

As can be seen from FIG. 6 of the accompanying drawings, the lever arm plate 27 provides an operative connection between the transverse pin 23 as carried by the intermediate element 20 and the damper or gas spring 32, providing a mechanical advantage. The magnitude of the mechanical advantage is dependent upon the ratio of the operative lengths of the two lever arms. As illustrated in FIG. 6A, the operative length of the first lever arm 26 is 69.5, whereas the operative length of the second lever arm which terminates at the lower end of the depending lug 29 is 58.8. The mechanical advantage is thus 58.8 divided by 69.5 which is 0.846.

Figure 6B:
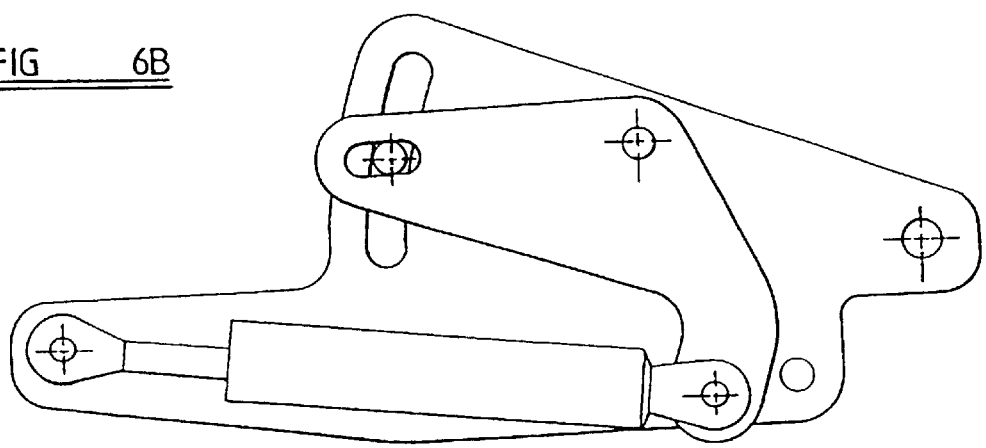

At an intermediate stage in the rearward pivoting movement of the back of the seat, as illustrated in FIG. 6B, it can be seen that the transverse pin 23 has moved part way up the arcuate slot 24 and part way along the linear slot 25 and the length of the first lever arm 26 is now 68.5 whereas, because of the change in angular position of the second lever arm which terminates in the depending lug 29, the length of the second lever arm is increased to be 65.7. The mechanical advantage of this condition is 68.5 divided by 65.7 which is 1.04.

Figure 6C:
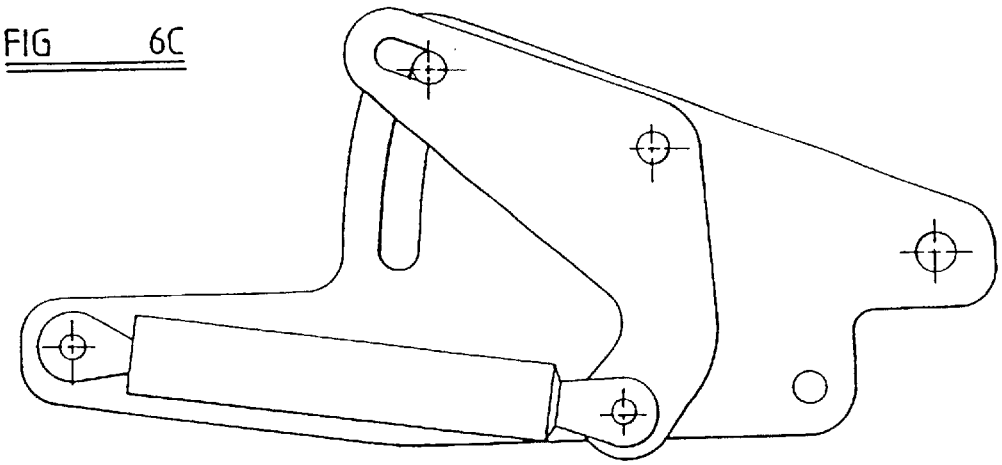

At the end of the pivoting movement of the back of the seat, as illustrated in FIG. 6C, the transverse pin 23 has moved to the top of the arcuate slot 24 and to the right-hand end of the linear slot 25. In this condition the length of the first lever arm is 64.5, and the length of the second lever arm is 73. The mechanical advantage is 73 divided by 64.5 which is 1.13.

It is thus to be appreciated that the damping effect provided by the damper or gas spring 32 substantially increases as the back of the seat moves rearwardly. Thus, the initial rearward movement of the seat in a rear impact, when the intermediate element 20 is pivoting about tie pivot point 19 is effected against a relatively low retarding force, whereas the end of the rearward pivotal movement of the back of the seat about the pivot point 19 is effected against a substantial retarding force.

It is believed that as the back of the seat moves rearwardly in this manner, the torso of the occupant will be accelerated slowly, whilst the head of the occupant may move rearwardly relative to the torso of the occupant until the head of the occupant engages the seat or a head-rest carried by the seat (as will be described below), and subsequently the body and the torso will be accelerated together as the rearward movement of the back of the seat is effected against a greater retarding force.

Whilst the connection between the squab of the seat and the back of the seat, as shown in FIG. 2 has now been described in detail, there are further features present in FIG. 2 which have not yet been described.

Returning now to FIG. 2, it is to be observed that the horizontal arm 17 forming the upper part of the frame that defines the back of the seat, carries two tubular guides 40,41 which extend substantially vertically. A head-rest support frame 42 is provided comprising a transverse upper element 43 and two depending arcuate arms 44,45 which pass respectively through the tubular guides 40,41. The lower ends of the arcuate alms 44,45 are interconnected by a transverse element 46 in the form of a plate 46. The plate 46 has terminal depending portions 47,48 which each define an aperture, the apertures receiving a horizontally extending rod 49. The opposed ends of the rod 49 are each received in a substantially vertical guide slot 50 formed in a guide plate 51 secured, respectively, to the arms 15,16 forming the sides of the frame that defines the back of the seat.

A spring 52 is provided which is connected to the transverse plate 46 and also connected to a further transverse rod 53 extending across the portion of the frame to be received within the back of the seat adjacent the base of that portion of the frame. The spring serves to bias downwardly the head-rest support frame 42.

A wire core 54 of a Bowden cable has one end connected to the transverse element 46. The wire core passes through a nipple 55 mounted on the horizontal arm 17. The outer sleeve 56 of the Bowden cable is connected to the nipple, and extends to a transfer box 57. Further Bowden cables 58,59 extend from the transfer box to the fixing plates 18 provided on the alms 11,12 of the portion of the frame to be received in the squab of the seat. As can be seen in FIG. 3, the Bowden cable 59 extends to a nipple 60 which is secured to the fixing plate 18. The core 61 of the Bowden cable extends to, and is connected to, the depending lug 29 formed on the lever arm plate 27.

It will thus be appreciated that as the back of the seat pivots rearwardly about the pivot axis 19, tension is applied to the core 61 of the Bowden cable 59.

Figure 7:
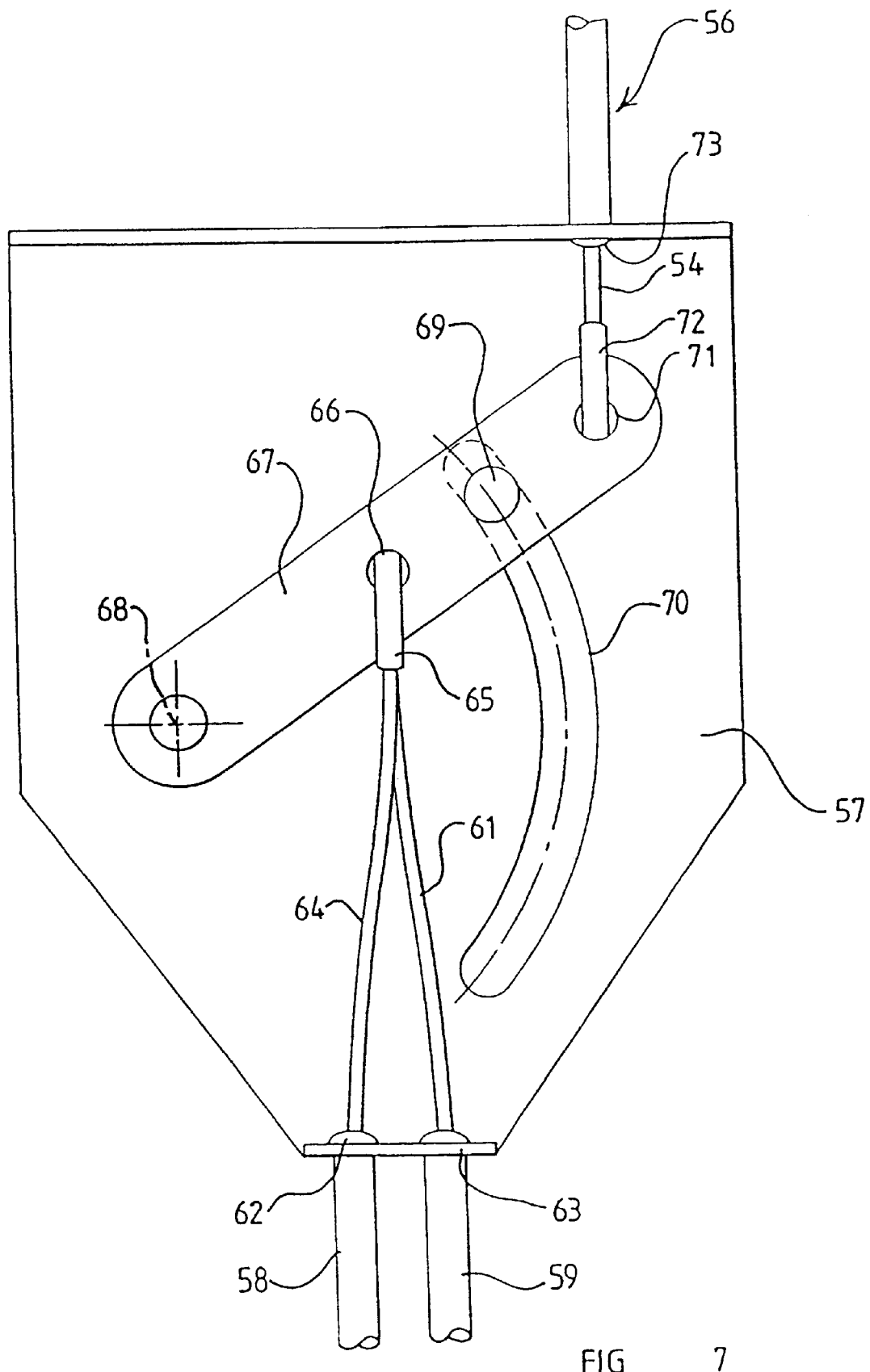
FIG. 7 is an enlarged view of the operative elements contained within a transfer box forming part of the seat illustrated in FIG. 2.

Turning now to FIG. 7 which illustrates the interior of the transfer box 57, it can be seen that the outer sleeves of the Bowden cable 58,59 terminate at nipples 62,63 respectively provided at the lower part of the transfer box 57. The cores 61,64 of the Bowden cables each pass to a hook 65. The single hook 65 engages an aperture 66 formed at the centre of a pivotally mounted lever 67. The lever 67 is pivotally mounted by a pivot pin 68 provided at one end thereof. The lever is provided with a projecting guide pin 69 which engages in an arcuate slot 70 provided in the transfer box 57. The end of the lever remote from the pivot pin 68 is provided with an aperture 71 which is engaged by a hook 72 which is connected to the core 54 of the Bowden cable 56. The outer sleeve of the Bowden cable 56 terminates at a nipple 73 provided at the upper pail of the transfer box 57.

It is thus to be appreciated that when a downward force is applied to the cores 61,64 of the Bowden cables 58,59 in response to a rearward pivoting movement of the back of the seat, the lever 67 is caused to pivot downwardly about the axis defined by the pivot pin 68, applying a substantial downward force to the core 54 of the Bowden cable 56. Because the outer sleeve of the Bowden cable 56 terminates at the nipple 55 provided on the horizontal arm 17, the core 54 extending between that nipple and the transverse element 46 is drawn upwardly into the Bowden cable, thus causing the entire head-rest support frame 42 to rise.

Figure 8:
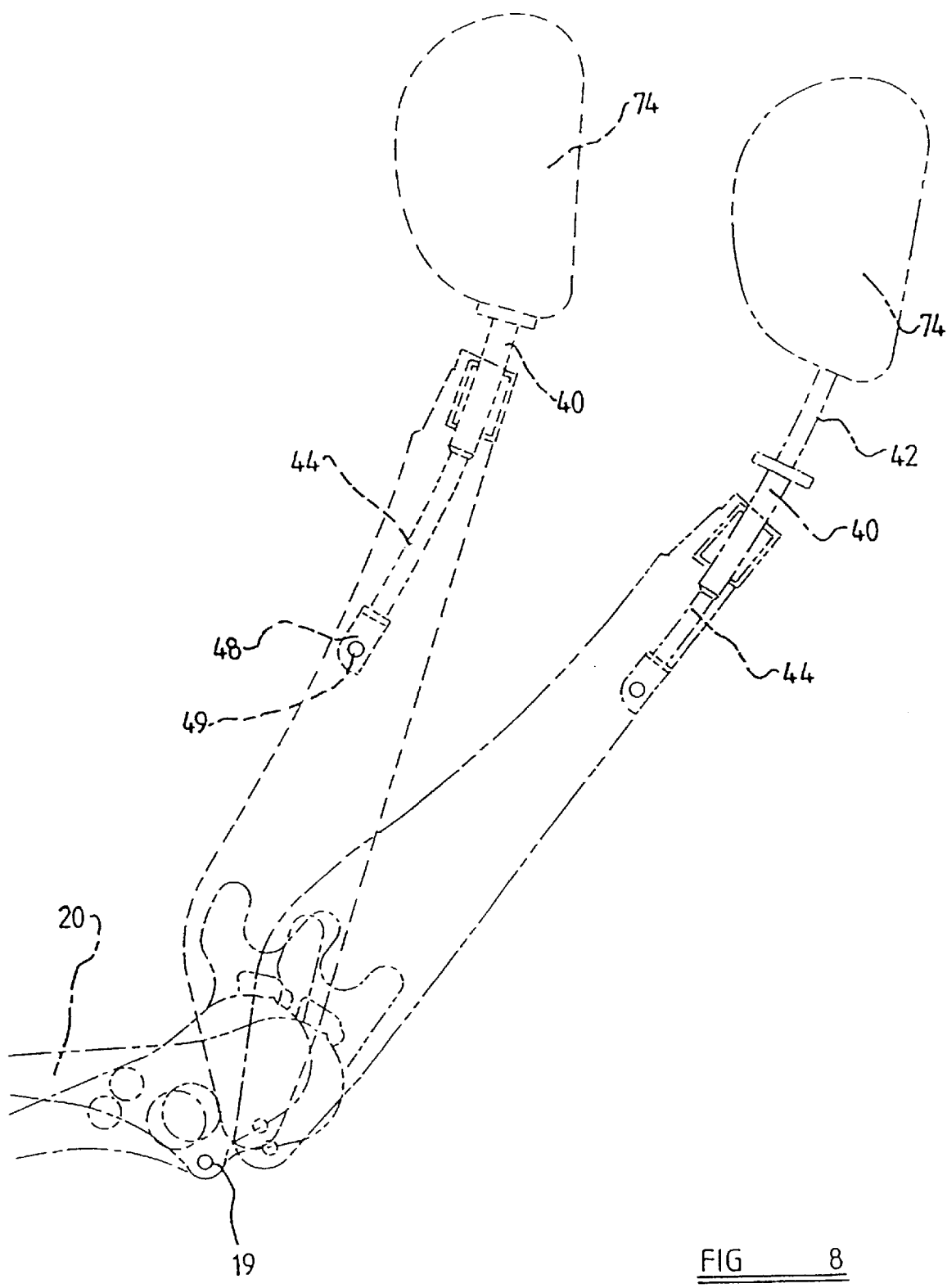
FIG. 8 is schematic view illustrating the back-rest of the seat in two alternate conditions.

As illustrated most clearly in FIG. 8, the frame 42 is intended to carry a head-rest 74. Also, as is clear from FIG. 8, as the back-rest of the seat moves rearwardly with a pivoting action about the pivot axis 19, the frame 42, carrying the head-rest, rises upwardly relative to the back of the seat, thus moving the head-rest from an initial lower position in which the head-rest is close to the top of the back of the seat, to an upper position in which the head-rest is a greater distance from the top of the back of the seat. Thus, the head-rest will be moved to be in an ideal position to restrain the head of an occupant of the seat in a rear impact situation.

What is claimed is:

1. A vehicle seat comprising:
    a squab;
    a back;
    an inner framework defining a first portion to be received within the squab of the seat and a second portion to be received within the back of the seat, the second portion being mounted on the first portion for rearward pivotal movement about a predetermined pivotal axis; and
    a damper, together with means for providing a mechanical advantage, connected between the first portion and the second portion, to dampen said rearward pivotal movement, the means for providing the mechanical advantage being disposed so that as the second portion of the framework moves rearwardly, pivotally relative to the first portion, the mechanical advantage changes so that the dampening effect increases.

2. The vehicle seat according to claim 1 wherein the damper comprises a gas spring.

3. The vehicle seat according to claim 1 wherein the means providing a mechanical advantage comprises a pivotally mounted lever arm element comprising two lever arms, a first lever arm being connected to the damper, and a second lever arm being connected to a component which moves in response to said rearward pivotal movement of the second framework portion about the predetermined pivotal axis.

4. The vehicle seat according to claim 3 wherein during pivotal movement of the lever arm element as a consequence of rearward pivotal movement of the second framework portion about said predetermined pivotal axis, the effective length of the first lever arm reduces, and the effective length of the second lever arm increases to provide the change in mechanical advantages.

5. The vehicle seat according to claim 3 wherein said lever arm element is connected to the component which moves in response to said rearward pivotal movement of the second framework portion about the predetermined pivotal axis by means which move axially of the lever arm as the lever arm element moves pivotally.

6. The vehicle seat according to claim 5 wherein the second lever arm defines an elongate substantially axially extending slot and the component carries an element engaged with the slot, which moves axially along the slot as the lever arm element moves pivotally.

7. The vehicle seat according to claim 3 wherein the lever arm element is pivotally mounted on a support plate, the component which moves in response to rearward pivotal movement of the second portion of the framework about the predetermined pivotal axis, also being pivotally connected to a fixing plate to define said predetermined pivotal axis.

8. The vehicle seat according to claim 3 wherein the component comprises a fixing plate carried by a recliner mechanism, the recliner mechanism having another fixing plate which is connected to the second portion of the framework adapted to be received within the back of the seat.

9. The vehicle seat according to claim 3 wherein during pivotal movement of the lever arm element as a consequence of rearward pivotal movement of the second framework portion about said predetermined pivotal axis, the effective length of the second lever arm reduces, and the effective length of the first lever arm increases to provide the change in mechanical advantages.

10. The vehicle seat according to claim 1 wherein the back of the vehicle seat is provided with a head-rest support frame, and the vehicle seat further comprises means for moving the head-rest support frame to an elevated position, relative to the back of the seat, in response to said rearward pivotal movement of the second portion of the framework about the predetermined pivotal axis.

11. The vehicle seat according to claim 10 wherein the moving means comprises:

a Bowden cable the core of which is connected to move the head-rest support frame upwardly against a spring bias when the core of the cable is subject to tension; and means for subjecting the core of the cable to tension in response to rearward pivotal movement of the back of the seat about the predetermined pivotal axis.

12. The vehicle seat according to claim 11 wherein the core of the Bowden cable is connected to a lever, the lever also being connected to at least one Bowden cable having its core connected to parts of a mechanism which move relative to fixed points on rearward pivotal movement of the back of the seat about the predetermined pivotal axis, with the core of the Bowden cables being connected to said fixed point.

\* \* \* \* \*